(12) United States Patent
Bouti

(10) Patent No.: US 6,382,528 B1
(45) Date of Patent: *May 7, 2002

(54) MIXER TO IMPROVE MELT HOMOGENEITY IN INJECTION MOLDING MACHINES AND HOT RUNNERS

(75) Inventor: Abdeslam Bouti, Swanton, VT (US)

(73) Assignee: Husky Injection Molding Systems, Ltd., Bolton (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/605,763

(22) Filed: Jun. 28, 2000

Related U.S. Application Data

(63) Continuation-in-part of application No. 09/435,965, filed on Nov. 8, 1999, now Pat. No. 6,089,468.

(51) Int. Cl.$^7$ ................................................ B05B 1/34
(52) U.S. Cl. ........................ 239/489; 239/139; 239/461; 239/488; 239/463; 239/590; 239/591; 425/567; 425/568
(58) Field of Search ................................ 239/461, 463, 239/482, 483, 487, 488, 489, 533.1, 590, 590.3, 590.5, 591, 397.5; 425/567, 568, 573

(56) References Cited

U.S. PATENT DOCUMENTS

| | | | |
|---|---|---|---|
| 137,881 A | * 4/1873 | Berryman et al. | 239/489 |
| 239,630 A | * 4/1881 | Walter | 239/405 |
| 982,106 A | * 1/1911 | Thornycroft | 239/457 |
| 1,469,479 A | * 10/1923 | Kent | 239/405 |
| 1,514,456 A | * 11/1924 | Gould | 239/400 |
| 1,882,241 A | * 10/1932 | Curran | 239/101 |
| 1,979,577 A | * 11/1934 | Sigwald | 239/406 |
| 3,486,700 A | * 12/1969 | Bristow | 139/435.4 |
| 3,743,187 A | * 7/1973 | Breunsbach | 239/489 |
| 3,788,557 A | * 1/1974 | Breunsbach | 137/897 |
| 4,014,469 A | * 3/1977 | Sato | 239/404 |
| 4,266,723 A | * 5/1981 | Osuna-Diaz | 239/132 |
| 4,279,588 A | * 7/1981 | Gellert | 219/421 |
| 5,916,605 A | 6/1999 | Swenson et al. | 425/564 |
| 5,935,616 A | 8/1999 | Gellert et al. | 425/130 |

\* cited by examiner

Primary Examiner—Lesley D. Morris
Assistant Examiner—Christopher S Kim
(74) Attorney, Agent, or Firm—Katten Muchin Zavis

(57) ABSTRACT

In an injection molding machine a mixer is provided that reduces the flow imbalances inherent in the melt as the flow branches within a manifold or other part of the injection machine. The mixer increase melt homogeneity by gradually mixing and changing the melt flow from all helical flow to all annular flow. The mixer provides an improved means for reducing flow imbalances that results in the elimination of weld lines and other part non-uniformities.

16 Claims, 5 Drawing Sheets

MIXER TO IMPROVE MELT HOMOGENEITY IN INJECTION MOLDING MACHINES AND HOT RUNNERS

CROSS-REFERENCE TO RELATED APPLICATIONS

This a Continuation-In-Part of application Ser. No. 09/435,965 filed Nov. 8, 1999, now U.S. Pat. No. 6,089,468.

BACKGROUND OF THE INVENTION

The present invention relates to a mixer in an injection molding machine. More particularly, the present invention relates to a mixer apparatus and method to improve the homogeneity of molten material in an injection molding machine and hot runners.

The large number of variables in the injection molding process creates serious challenges to creating a uniform and high quality part. These variables are significantly compounded within multi-cavity molds. Here we have the problem of not only shot to shot variations but also variations existing between individual cavities within a given shot. Shear induced flow imbalances occur in all multi-cavity molds that use the industry standard multiple cavity "naturally balanced" runner system whereby the shear and thermal history within each mold is thought to be kept equal regardless of which hot-runner path is taken by the molten material as it flows to the mold cavities. These flow imbalances have been found to be significant and may be the largest contributor to product variation in multi-cavity molds.

Despite the geometrical balance, in what has traditionally been referred to as "naturally balanced" runner systems, it has been found that these runner systems can induce a significant variation in the melt conditions delivered to the various cavities within a multi-cavity mold. These variations can include melt temperature, pressure, and material properties. Within a multi-cavity mold, this will result in variations in the size, shape and mechanical properties of the product. Though the effect is most recognized in molds with eight or more cavities, it can create cavity to cavity variations in molds with as few as two cavities.

The flow imbalance in a mold with a geometrically balanced runner is created as a result of shear and thermal variations developed across the melt as it flows through the runner. The melt in the outer region (perimeter) of the runner's cross-section experiences different shear and temperature conditions than the melt in the center region. As flow is laminar during injection molding, the position of these variations across the melt stream is maintained along the length of the runner branch. When the runner branch is split, the center to perimeter variation becomes a side to side variation after the split. This side to side variation will result in variations in melt conditions from one side to the other of the part molded from the runner branch. If the runner branches were to split even further, as in a mold with 4 or more cavities, there will exist a different melt in each of the runner branches. This will result in variations in the product created in each mold cavity. It is important to note that as consecutive turns and/or splits of the melt channel occur, the difference in melt temperature and shear history is further amplified. This cumulative effect is clearly recognized in large multi-cavity molds where the runner branches split and turn many times.

In an attempt to reduce this variation, the prior art has been directed at various mixing devices that are located within the runner nozzle which is typically just prior the mold cavity.

U.S. Pat. No. 5,405,258 to Babin shows a hot runner nozzle having a torpedo which is used to conduct heat absorbed from the upstream melt along its length to the gate area. The torpedo is positioned within the melt stream and supported by spiral blades that induce a swirling motion to the melt as it flows past them.

U.S. Pat. No. 5,849,343 to Gellert et al. shows a valve gated nozzle having a stem guiding nozzle tip that causes the melt to divide from a cylindrical flow to annular flow as it flows by the valve stem.

U.S. Pat. No. 4,965,028 to Manus et al., U.S. Pat. No. 5,513,976 to McGrevy, European Patent 0 546 554 to Gellert, and German Patent DE 32 01 710 to Gellert all teach various ways to mix the melt in a hot runner nozzle.

U.S. Pat. No. 5,545,028 to Hume et al. shows a hot runner tip having a semi-torpedo style in which the outer surface of the torpedo includes a flow channel that converts a single cylindrical inlet flow to an annular flow passing by the tip.

In spiral mandrel dies used in extrusion molding, single or multiple incoming cylindrical melt streams can be converted to a single annular outflowing stream in a continuous process like blown film extrusion molding. U.S. Pat. Nos. 5,783,234 and 5,900,200 to Teng show one application of this in a hot runner valve gated nozzle in which the spiral elements are formed in a comparatively large diameter valve stem and positioned relatively distant from the mold cavity.

U.S. Pat. No. 5,683,731 to Deardurff et al. shows a melt flow redistributor. This device is an annular plug that is inserted at the intersection of branching hot runner channels. A first diverter is included for distributing the outside boundary later of the melt into a plurality of hot runner branches. A second diverter is included that distributes the center boundary layer of the melt into a plurality of hot runner branches for mixture with the outside boundary layer. In operation, this device acts more as a flow flipper than a mixer, with very little mixing and melt homogenizing occurring.

None of the prior art teaches an apparatus for reducing the variation within a melt flow as it travels through the runner branches by gradually changing the flow from all helical to all annular. The prior art attempts to reduce the variation within the melt by altering the flow of the melt within the nozzle. By the time the melt reaches the nozzle, there exists a large variation in the melt due to the cumulative effects of the flow imbalance. Indeed, the efficiency of the prior art will benefit from the use of the present invention because the melt that reaches the mixers of the prior art that are located at the nozzle will have less variations in thermal and shear properties, thereby reducing the amount of mixing required by the nozzle mixing device and thereby improving overall part quality.

There exists a need, therefore, for an apparatus and method for use in injection molding machines that will reduce the cumulative effects of flow imbalance as it splits into multiple branches within the runner system, thereby reducing the variations that occur in the finished product of a multi-cavity system.

SUMMARY OF THE INVENTION

The primary objective of this invention is to provide a method and apparatus for reducing the flow imbalances that occur in an injection molding machine and runner system thereby creating high quality plastic articles.

Another objective of this invention is to increase the efficiency of melt mixers that are installed in the nozzle of an injection molding machine by reducing flow imbalance effects.

Still another objective of the present invention is to provide a method and apparatus for improving the homogeneity of the melt and reduce the effects of flow imbalance within a multi-cavity mold.

The foregoing objects are achieved by the installation of the present invention in an injection molding machine, particularly in the runner system of a multi-cavity mold. The present invention includes a flow channel for resin flow having an inlet area for receiving molten resin, an outlet area for transferring molten resin further downstream; an elongated shaft extending in the flow channel, such as a guide or torpedo, adjacent the outlet area; at least one spiral groove formed in the inner surface of the flow channel and facing the shaft that decreases in depth towards the outlet area, with lands adjacent said groove that increases in clearance towards the outlet area, wherein a helical flow path of resin is provided through the spiral groove and an axial flow path of resin is provided over the lands. Preferably, a sleeve is provided in the flow channel adjacent the elongated shaft, wherein the groove is formed in the sleeve. A portion of the lands are generally bonded, press-fit or taper locked to the shaft and the lands increase in clearance with respect to the shaft towards the outlet area.

The injection molding method of the present invention includes; supplying molten resin to a flow channel having an inner surface thereof in an injection molding machine runner, which flow channel extends in said runner from an inlet area to an outlet area for transferring molten resin further downstream in an injection molding machine; providing an elongated shaft in the flow channel adjacent the outlet area; transferring the molten resin to at least one spiral groove, said groove formed in the inner surface of the flow channel, and transferring the resin from the groove to the outlet area; decreasing the depth of the groove towards the outlet area and increasing the clearance of the lands toward the outlet area; thereby flowing the resin in a helical flow path through the spiral groove and in an axial flow over the lands.

Further features of the present invention will appear hereinbelow.

BRIEF DESCRIPTION OF THE DRAWINGS

The present invention will be more readily understandable from a consideration of the accompanying illustrative drawings, wherein.

NUMERALS USED IN DRAWINGS

10—a first preferred embodiment of the invention
12—flow channel housing
14—flow channel
15—inner surface
16—inlet area
18—outlet area
36—elongated torpedo
38—rear area
40—forward area
42—sleeve
44—bond area
46—spiral groove
48—lands
50—annular section
52—hot runner channel
54—exit flow
56—manifold
58—second spiral groove
60—second lands
62—first flipper channel
64—second flipper channel
100—a second preferred embodiment
200—a third preferred embodiment

DETAILED DESCRIPTION OF PREFERRED EMBODIMENTS

Figure 1:
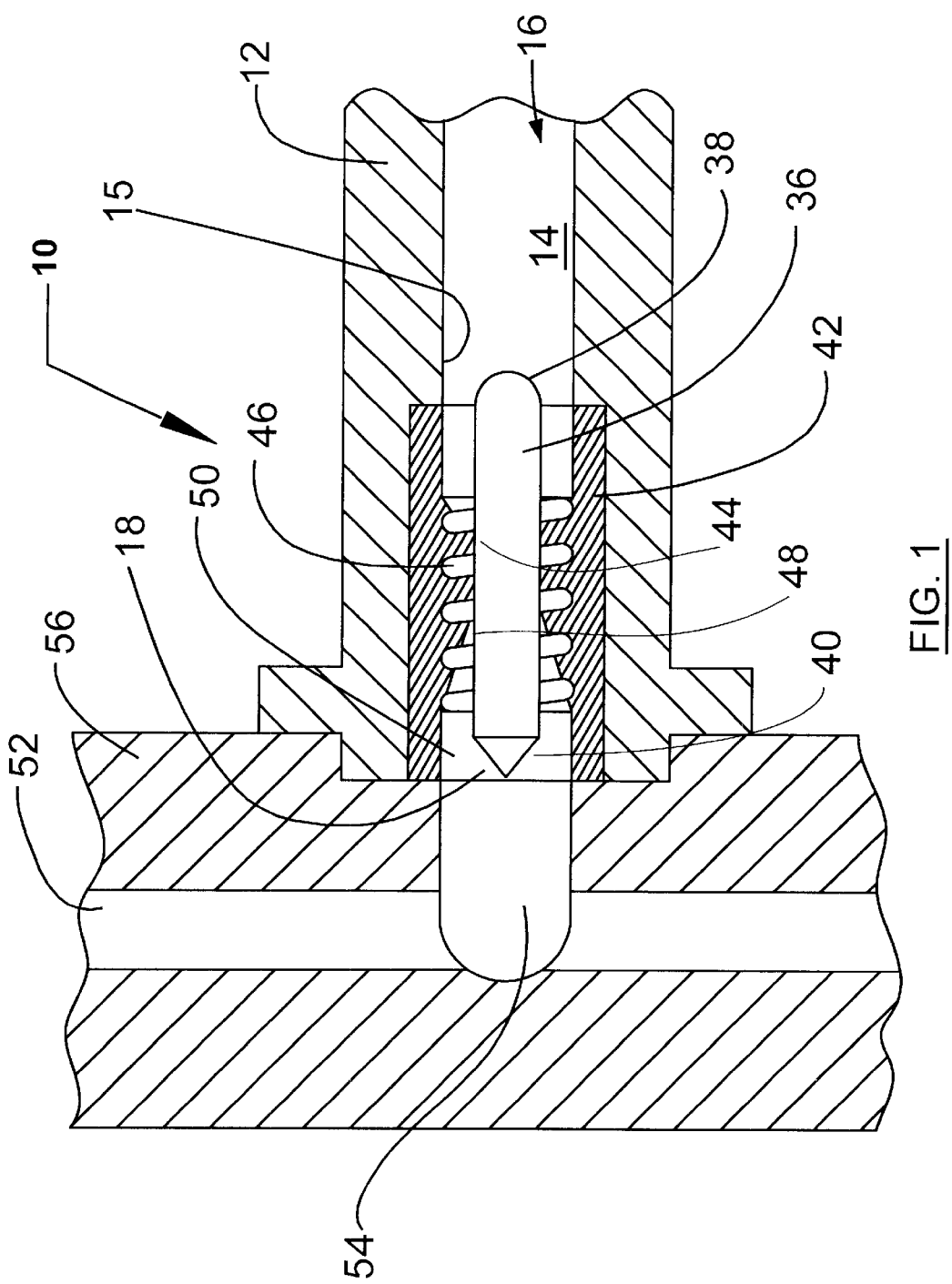
FIG. 1 is a partial sectional view of an exemplicative embodiment of the present invention installed in a molding machine sprue bar.

Referring to FIG. 1, a torpedo style melt mixer 10 is shown including a cylindrical flow channel housing 12 and a melt flow channel 14 in the housing. The flow channel 14 includes an inner surface 15 thereof, inlet area 16 for receiving molten resin and an outlet area 18 for transferring molten resin further downstream in a hot runner channel 52.

Elongated torpedo 36 is provided extending in flow channel 14 adjacent outlet area 18. The torpedo 36 has a curved rear area 38 and a pointed forward area 40. The torpedo is trapped and located in the flow channel 14 by a sleeve 42 which is inserted into the flow channel housing 12. The torpedo 36 is engaged by the sleeve 42 at bond area 44, which rigidly affixes the torpedo to the sleeve by welding, brazing or similar retention means. The torpedo is preferably made of a thermally conductive material such as beryllium copper or tungsten carbide, while the sleeve can be made of any abrasion resistant material such as steel or tungsten carbide, possibly manufactured by electrical discharge machining(EDM), powder metal molding, turning, broaching, casting or any other suitable process.

The outer surface of the torpedo 36 is cylindrical. The exposed surface of the sleeve 42 includes at least one spiral groove 46. Since the exposed surface of the sleeve 42 at least in part forms the inner surface 15 of flow channel 14, at least one spiral groove 46 is formed in the inner surface of the flow channel. In addition, said spiral groove faces torpedo 36.

Lands 48 are provided adjacent the spiral groove 46. The groove is formed so that it decreases in depth towards the outlet area 18. Lands 48 are bonded to torpedo 36 at bond area 44 adjacent the inlet area 16. The lands 48 present an initial clearance and increase in clearance with respect to torpedo 36 towards outlet area 18. The initial clearance is an optional feature and is preferably at least 0.05 mm. This initial clearance is important for color change performance because it enables the flushing of any resin that may hang-up in the dead spots that occur between the spiral grooves. Otherwise, the resin will tend to fill part of the small initial clearance and hang-up there for a longer period of time making color changes very lengthy. Also, the resin may hang-up there until it degrades and bleeds back into the melt stream. However, by providing an initial clearance of at least 0.05 mm this abrupt, definite clearance at the end of the contact between the lands and the shaft enables part of the melt stream to flow in the circumference between the grooves to clean out the dead spots.

In operation therefore, the melt flows from the inlet end 16 of the flow channel 14 towards outlet end 18 of flow channel 14 through the annular portion of the flow channel. The melt enters one or more of the spiral grooves or channels 46 before reaching the outlet end 18. The spiral grooves induce a helical flow path to the melt. As the melt progresses towards the gate 32, progressively more and more of the melt spills over lands 48 as the lands increase in clearance and as the groove depth decreases so that the helical flow direction is gradually transformed to an axial flow direction over the length of sleeve 42. At the end of the spiral groove section, the melt passes to the annular section 50 of flow channel 14 downstream of groove 46 which is comparatively large in diameter. Accordingly, the melt stream is relaxed as it flows through annular section 50. The relaxation section helps to minimize stresses and any flow irregularities and further homogenize the melt. Finally, the melt passes through to exit flow 54 where it splits into hot runner channels 52 of manifold 56. From there, the flow path could further split, whereby the present invention could be installed prior to each split to continually mix and homogenize the melt.

The mixer design of the present invention can be defined by the following four zones:

A zone of adherence between the lands and the shaft may feature a tapered seat that locks the torpedo to resist pressure action. This zone provides the support and/or alignment for the torpedo.

A zone of a finite initial gap or initial clearance that consists of an abrupt elimination of the contact between the sleeve lands and the shaft. This feature prevents resin hang-up that may occur when the clearance increase starts from zero. This initial gap allows part of the melt to flow around and clean the dead spots generated between the grooves at the beginning of the clearance increase. The initial clearance value depends on the material processed and the process parameters (flow rate, etc.).

A zone of flow conversion where the melt stream is converted gradually from a helical flow that produces a more thermally and mechanically homogeneous melt into an annular flow without creating weld lines that will appear in the molded part. In this zone the depth of the grooves decrease gradually and the gap between the shaft and the lands increase gradually.

A relaxation zone that enables the polymer's molecules to relax from the stresses that accumulated during the flow conversion in the previous zone. The relaxation zone can be used as well as a run-out for manufacturing tools.

Figure 2:
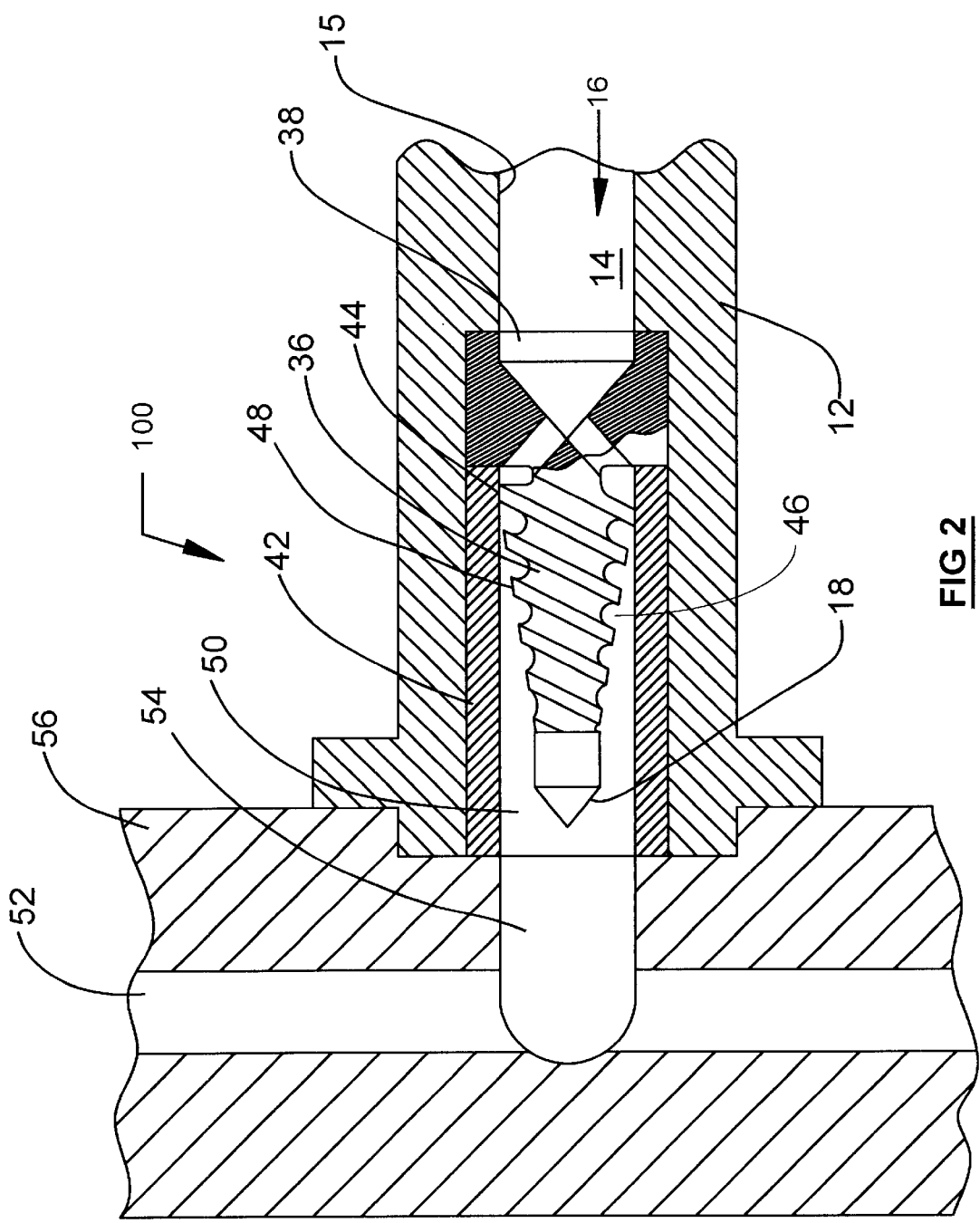
FIG. 2 is a partial sectional view of a further embodiment of the present invention.

Referring now to FIG. 2, this embodiment is similar to FIG. 1 (so similar numerals are used to point out similar features) wherein the torpedo 36 is a tapered shaft with a helical groove therein. Alternatively, the torpedo 36 could be cylindrical, with the spiral grooves 46 decreasing in depth towards the outlet area 18. The melt flows into an annular inlet area 16 of the torpedo 36 and then enters at least one spiral groove 46 located on the outer surface of the torpedo 36. Similar to the embodiment of FIG. 1, the depth of the spiral groove 46 decreases toward the outlet area 18. Located adjacent groove 46, are lands 48 which interface with the sleeve 42, the height of the lands 48 decrease towards the outlet area 18. The biggest difference between this embodiment and the embodiment shown in FIG. 1 is that the location of the spiral groove 46 is on the outside surface of torpedo 36, facing the flat cylindrical surface of sleeve 42. Alternatively, the cylindrical surface of sleeve 42 could be tapered so as to create a gradually changing gap with the lands 48.

The general operating principle of this embodiment is quite similar to the embodiment in FIG. 1. As the flow travels from the inlet area 16 to the outlet area 18, the melt is directed into at least one spiral groove 46. As the melt travels further down the spiral groove, the gap created between the lands 48 and the cylindrical surface 42 allows the melt flow to gradually transition from a helical flow to an annular flow. This gradual transition mixes the melt, thereby creating a more homogeneous melt. As described previously, the lands 48 present an initial clearance with respect to torpedo 36 towards outlet area 18. The initial clearance is an optional feature and is preferably at least 0.05 mm. This initial clearance is important for color change performance because it enables the flushing of any resin that may hang-up in the dead spots that occur between the spiral grooves 46. Otherwise, the resin will tend to fill part of the small initial clearance and hang-up there for a longer period of time making color changes very lengthy.

Figure 3:
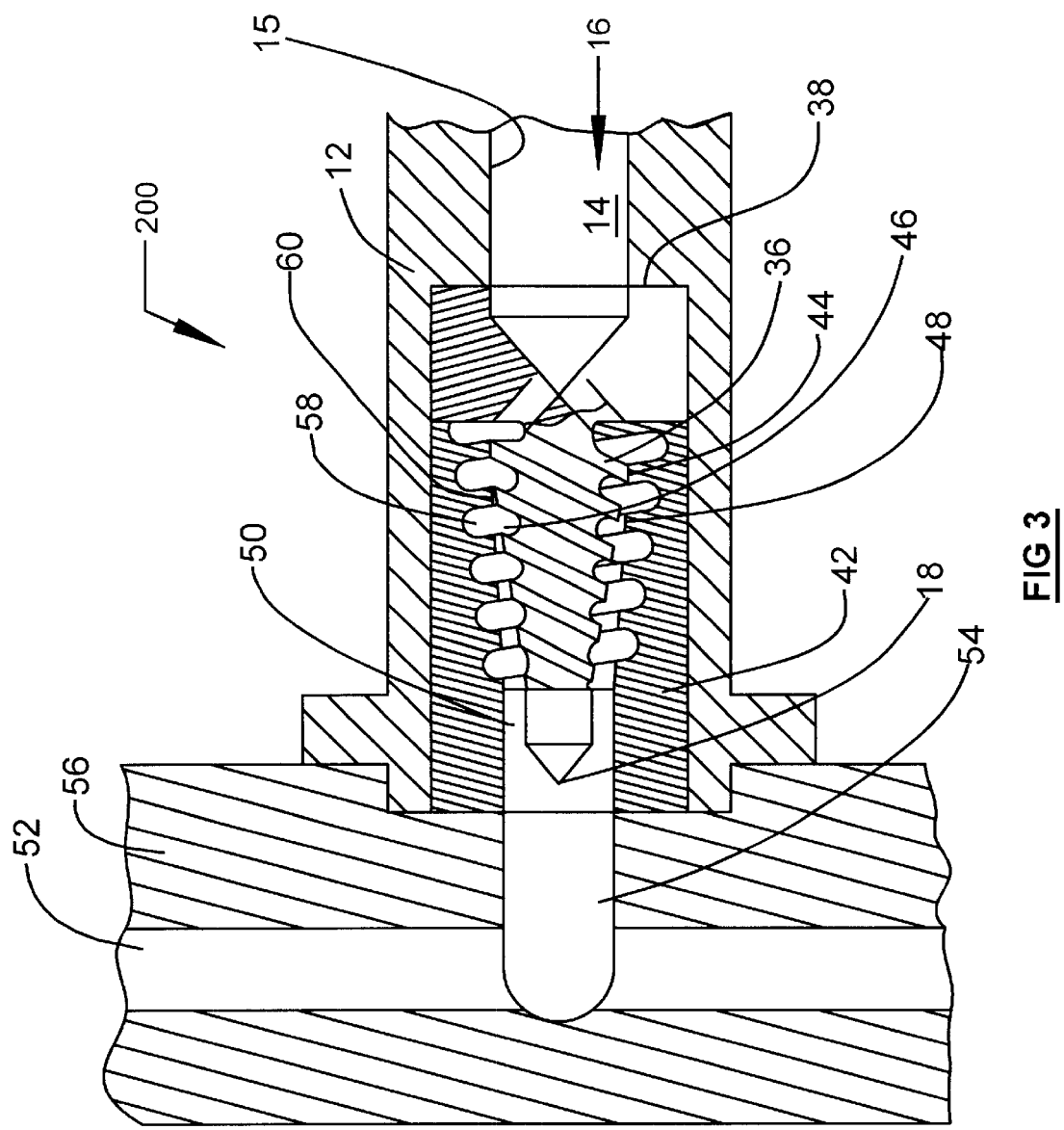
FIG. 3 is a partial sectional view of a further embodiment of the present invention.

Referring now to FIG. 3, another embodiment of the present invention is shown. This embodiment is similar to the previously discussed embodiments, with the biggest difference being that a second spiral groove 58 is formed in the inside surface of the sleeve 42, the second spiral groove faces the torpedo 36, with second lands 60 adjacent the second spiral groove 58. Lands 48 are located adjacent the second lands 60, with the gap created between the lands 48 and 60 increasing towards the outlet area 18. The second spiral groove 58 is located adjacent the spiral groove 48, thereby creating a contiguous spiral groove for the melt as it travel towards the outlet area 18. The operation of this embodiment is again similar to the previous embodiments whereby the flow gradually transitions from a helical flow to a annular flow as more and more melt is allowed to flow between the lands 48 and the second lands 60.

Figure 3A:
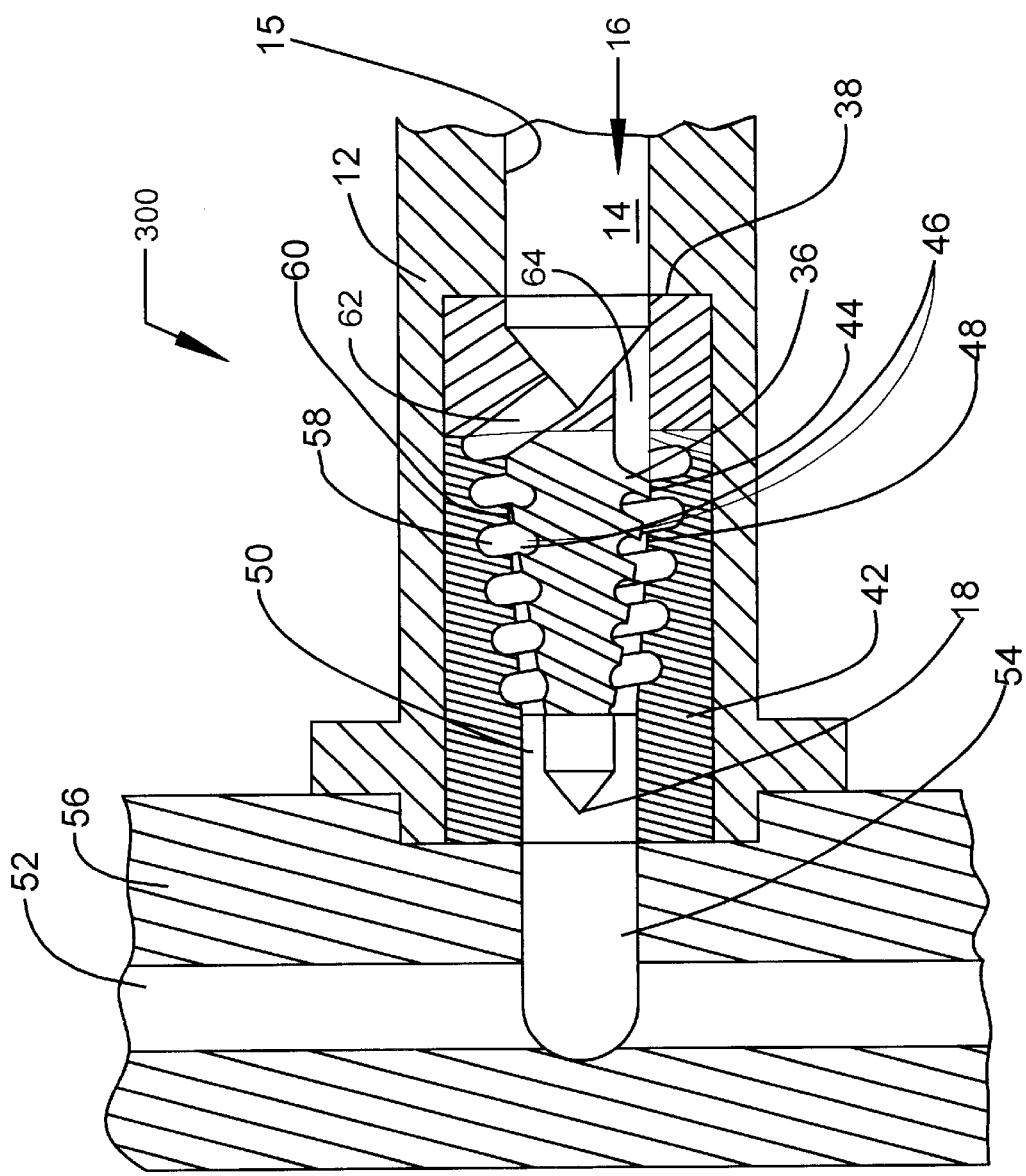
FIG. 3a is a partial sectional view of a further embodiment of the present invention.

Referring now to FIG. 3a, another embodiment of the present invention is shown which is similar to the previous embodiment shown in FIG. 3, except that a first and second flipper channels 62 and 64 respectively have been added. The first flipper channel 62 is a cylindrical passageway located in the rear area 38 which transfers the flow of molten material from the center of the flow channel 14 to the second spiral groove 58. The second flipper channel 64 is a cylindrical passageway located in the rear area 38 which transfers the flow of molten material from the outside periphery of the flow channel 14 to the spiral groove 46. Hence, the addition of the first and second flipper channels 62 and 64 provides a means for flipping the flow as it enters the spiral grooves and this further homogenizes the melt.

While FIG. 2 shows the spiral groove 46 machined into torpedo 36, one could easily envision the spiral groove being formed by a piece of appropriately shaped sheet material that is twisted or formed about a central axis. The diameter of each twist being reduce to increase the gap between the helical surface and the inner wall 15. This embodiment would provide a spiral shaped surface for helical flow of the melt while the gap between the outer diameter of the helical surface and the inner wall 15 is gradually increasing towards the outlet area 18 to transition more and more of the flow from helical to annular flow.

Figure 4:
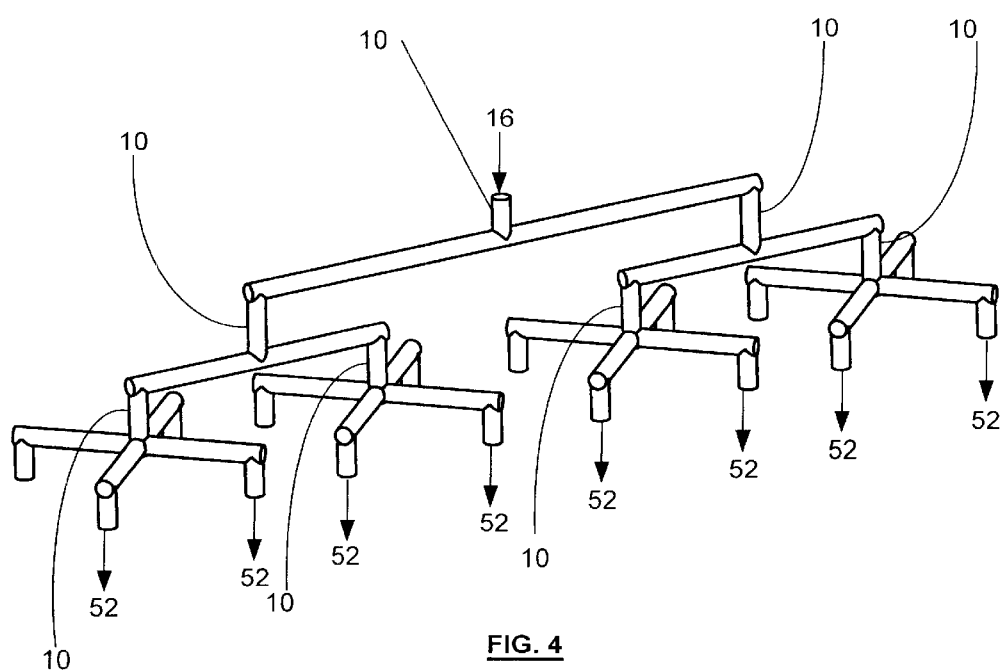
FIG. 4 is an isometric view of the present invention installed in various locations within a hot runner system.

Referring to FIG. 4, the present invention 10 or any of the preferred embodiments, can be installed in many locations within an injection molding machine and a hot runner system. As the biggest flow imbalances are caused by the splitting of the non-homogenous melt within the hot runner channel 52, the present invention performs best if installed upstream at each branch in the molding machine. The mixer of the present invention increases the melt homogeneity before a split occurs, thereby reducing the presence of any flow imbalances. Reducing flow imbalances as previously discussed reduces the chances of weld lines in the product as well as ensure equal filling of the mold cavities.

It is to be understood that the invention is not limited to the illustrations described and shown herein, which are deemed to be merely illustrative of the best modes of carrying out the invention, and which are susceptible to modification of form, size, arrangement of parts and details of operation. The invention rather is intended to encompass all such modifications which are within its spirit and scope as defined by the appended claims.

I claim:

1. In an injection molding machine, a mixer comprising:
   a). a flow channel for resin flow having an inlet area for receiving molten resin and an outlet area for transferring molten resin;
   c). said flow channel further having an inner surface thereof;
   d). an elongated shaft extending in the flow channel adjacent the outlet area;
   e). at least one spiral groove formed in the inner surface of the flow channel and facing the shaft, said groove decreasing in depth towards the outlet area, with lands adjacent said groove that increase in clearance towards the outlet area;
   f). wherein a helical flow path of resin is provided through the spiral groove and an axial flow path of resin is provided over the lands.

2. A mixer according to claim 1, wherein said groove is cut into the inner surface of the flow channel.

3. A mixer according to claim 1, including a sleeve in the flow channel adjacent the elongated shaft, wherein said groove is formed in the sleeve.

4. A mixer according to claim 3, wherein a portion of the lands are bonded to the shaft and wherein the lands increase in clearance with respect to the shaft towards the outlet area.

5. A mixer according to claim 4, wherein an initial clearance of at least 0.05 mm is provided adjacent where said shaft is bonded to said lands.

6. A mixer according to claim 1, wherein said shaft is a torpedo.

7. A mixer according to claim 1, wherein said helical flow path is gradually changed to an axial flow path.

8. A mixer according to claim 1, wherein said spiral groove is formed in the inner surface of the flow channel and in the outer surface of said elongated shaft.

9. A mixer according to claim 8, wherein said groove is substantially circular.

10. A mixer according to claim 1, wherein said shaft is tapered.

11. A mixer according to claim 10, wherein said spiral groove is formed on the outer surface of said tapered shaft.

12. A mixer according to claim 10, wherein said spiral groove is formed in the inner surface of the flow channel and in the outer surface of said tapered shaft.

13. A mixer according to claim 12, including a first flipper channel communicating the flow of molten material from the center of said flow channel to said spiral groove formed in the inner surface of the flow channel; and a second flipper channel communicating the flow of molten material from the periphery of said flow channel to said spiral groove formed in the outer surface of said tapered shaft.

14. A mixer according to claim 1, wherein said mixer is installed in a sprue bar.

15. A mixer according to claim 1, wherein said shaft is formed from a twisted piece of sheet material, thereby forming a helical surface.

16. A mixer according to claim 1, wherein said mixer is installed in a stack mold application.

* * * * *